United States Patent [19]

Simon et al.

[11] Patent Number: 5,122,271
[45] Date of Patent: Jun. 16, 1992

[54] FILTER FOR CYLINDRICAL AND FLAT FILTER EQUIPMENT FOR USE IN FILTERING FLUIDS

[76] Inventors: Lajos Simon, Táncsic M. ut 26, 2457 Adony; László Simon, Zalka M. ût 6, 7000 Sárbogárd, both of Hungary

[21] Appl. No.: 497,339

[22] Filed: Mar. 22, 1990

[30] Foreign Application Priority Data

Mar. 24, 1989 [DE] Fed. Rep. of Germany ....... 3909810

[51] Int. Cl.⁵ .......................................... B01D 29/48
[52] U.S. Cl. ................... 210/314; 210/346; 210/486; 210/487; 210/488; 210/498
[58] Field of Search ............... 210/314, 346, 486, 487, 210/488, 498; 55/278

[56] References Cited

U.S. PATENT DOCUMENTS

| | | | |
|---|---|---|---|
| 589,887 | 9/1897 | Ziegler | 210/346 |
| 2,670,851 | 3/1954 | Curtis | 210/488 |
| 2,978,108 | 4/1961 | Strassheim | 210/346 |
| 3,005,556 | 10/1961 | Jensen | 210/488 |
| 3,152,988 | 10/1964 | Gutkowski et al. | 210/486 |
| 3,221,882 | 12/1965 | Frantz | 210/488 |
| 3,334,750 | 8/1967 | Ullman, Jr. | 210/486 |
| 3,827,568 | 8/1974 | Toth et al. | 210/488 |
| 4,686,041 | 8/1987 | Van den Berg et al. | 210/488 |
| 4,709,863 | 12/1987 | Szkaaradel et al. | 210/488 |
| 4,740,302 | 4/1988 | Rosenberg | 210/488 |
| 4,753,731 | 6/1988 | Drori | 210/488 |
| 4,774,000 | 9/1988 | Kawai et al. | 210/346 |
| 4,844,806 | 7/1989 | Drori | 210/448 |
| 4,966,702 | 10/1990 | Drori | 210/488 |

*Primary Examiner*—Robert A. Dawson
*Assistant Examiner*—Wanda L. Millard
*Attorney, Agent, or Firm*—Ladas & Parry

[57] ABSTRACT

A filter for cylindrical of flat filter equipment for the mechanical purification of liquids as described which is assembled of several filter elements (4) arranged one above the other which disclose always gap-shaped filter openings between them and which are fastened by rods led through them and locking flanges. The passage openings for the rods are formed as sleeves (7) to which distance holders (8) belong. The filter elements have trapezoidal cross-section, the outer longer base side (16a) of which, together with the height of a filter opening, make out the height of the sleeve (7).

5 Claims, 4 Drawing Sheets

FILTER FOR CYLINDRICAL AND FLAT FILTER EQUIPMENT FOR USE IN FILTERING FLUIDS

The invention relates to filter for cylindrical or flat filter equipment for use in filtering fluids contaminated with micro- or macro-particles, according to the preamble of claim 1.

Filters of the most different construction are known for the mechanical purification of fluids.

In the patent specification No. De-PS 19 15 561 a filter layout provided with rotary filter drum is described, used for the concentration of fibre suspension. With this filter, rods are arranged parallel to the axis between the two end walls, thus a cylindrical basket is formed enclosed by a filter mantle. This construction is highly complicated and the reliability of the filter equipment as well as the quality of the construction are not satisfactory.

A special filter construction is introduced in the patent specification No. DE-OS 25 12 781. The frame of this filter consists of longitudinal rods and spirally reeled wire on the rods. The proper filter cloth is arranged on the frame made in this way. Thus, a traditional filter is produced where neither the spiral-shaped wire nor the bearing longitudinal rods participate in the filtration they serve, however, only for the reinforcement of the filter cloth.

Another filter construction is described in the patent specification No. DE-OS 22 41 063 where two wires are spirally wound parallel to each other on a perforated bearing rod. One of the wires has polygonal, the other has circular or square-cross section. The liquid flows in through the openings between the circular or square cross section. In case of polygonal construction, the filter openings have variable sizes, therefore colmation (seizure) and some failures may occur. The cleaning is rather circuitous, performable only with the so-called counterflow method. The reason thereof is that the filter openings of the polygonal wires are shaped inwards either increasing or decreasing.

The invention intends to provide for a filter of the said kind having a simple and stable construction and being comprehensive in its applicability which renders possible in addition to the optimal filtration a light purification and service.

This task is performed by a filter having the characteristic criteria contained in claim 1. Advantageous improvements are contained in the sub-claims.

The essence of the invention consists in the recognition that due to the openings of optional size, and of necessary size, respectively, widening continuously and permanently inwards, only a minimum pressure loss occurs by using filter elements arranged and fixed one above the other.

In addition, the filter surface is increased, achieved by polygonal filter openings resulting in a larger inflow surface. Consequently, the bypass value of the inflow surfaces can be multiplied.

Further on, the advantage of the invention is that due to the inwards widening filter openings the fibe-grained materials can be separated and retained by the outer construction of the openings. It follows that the cleaning of the filter element accurs in consequence of the Venturi effect, due to the inwares widening openings, because in this way the kinetic energy of the fluid increases when flowing in and the higher rates eliminate the precipitation.

According to the invention it is advantageous that cylindrical or flat filters can be used for the filtration of liquids contaminated with micro- or macro-particles. The filters contain ring-shaped elements or segments arranged one above the other straight elements which can be engaged by suitable round cross section connecting rods having always outer joining flanges, while the filter openings are formed between the filter elements. The filter elements are developed of one unit each or assembled or partial units or segments. All element, and their basic bodies, respectively, have trapezoidal cross section with base sides parallel to each other where the large side is the inflow side for the liquid. From one of the two oblique side faces several sleeves extend in equal distance to each other to which several dropshaped or wedge-shaped distance holders are attached. In the other oblique side face notches are made in which the sleeves and the distance holders e.g. of the elements to be found underneath intrude. Further on, the round joining rods and bracings are led through the sleeves of the filter elements fastened to the locking flange, and joining flange, respectively, by means of screws and nuts or by welding.

According to another embodiment of the invention the filter can be made in such a way that on both side faces of the trapezoidal cross section of filter elements a row of polygonal teeth are uniformly arranged. The teeth are spaced vertically and parallel with the mantle edge of the longer base side of the trapezoid in such a manner that the surfaces of the tooth tips, synchronously with the oblique faces of the trapezoid, produce always a contracting bypass cross section.

The two counter-moving teeth rows are displaces as compared to each other so that e.g. a tooth space of the upper tooth row corresponds to a tooth of the lower tooth row. Consequently, with the superposition of filter elements the teeth will interpenetrate practically locking and according to the sizing of the width and depth of tooth, filter openings will be formed between the tooth tip and the upper edge of the cross section of trapezoid as well as vertical gaps will be formed between the teeth. It is advantageous especially for the vertical gaps if the teeth reduce towards the inside of the filter i.e. towards the outlet side so that e.g. a wedge-shaped horizontal cross section of the tooth is provided for.

Further on, the filter elements can be shaped with teeth arranged intermittently on the upper and lower sides so that the teeth do not end in the mantle formed by the large base side by they reach beyond it. Thus, e.g. the tooth surface can be shaped on the inlet side of the element always tapered, in triangle or in V-form, consequently, the filter element, viewing from outside, seems especially in its assembled state, like a cylinder provided with V-shaped grooves and the surface is essentially zigzag-shaped, respectively. In addition, the teeth are made attenuated again in the direction of the outlet and the tooth tip shows an inward obliquity so that the bypass openings reduce on the inlet side and widen again on the outlet side in the same way, realizing thus the above said advantages.

With the development of the filter elements built up of several straight or ring segmental parts, a sleeve provided with a fitting notch and bordered with distance pieces is arranged. At the ends of the sections of filter elements a half-sleeve each is to be found with fitting ring or fitting flange engaging with the fitting notch of the element arranged above or below. When assembling a filter, the section of the filter elements are combined for forming a filter element in such a manner that the half-sleeves join for forming a complete sleeve. Further on. the filter element above it is built up from the section so that they will lie one above the other in brick-like displaces position.

It is advantageous if the sleeves and distance holders are of the same height as the filter elements and their large trapezoidal base side and the height of the filter openings respectively. Filter openings of uniform size can be created with the simple accurate superposition of the filter elements.

The filter according to the invention has several advantages, especially due to its diverse applicability and utilization. It may be used for the mechanical purification of all liquids of whatever form and dimension. Thus, the filter can be successfully used as well-filter. In addition it is applicable as element for a water purifying equipment of large diameter where the surface is cylindrical or flat. Its extremely advantageous applicability is ensured by the filter elements which can be prepared as individual ready elements or as adjustable partial elements.

Thus according to the invention high-gauge cylindrical or flat filter equipment can be assembled of partial elements which can be fitted together brick-like to filter elements of optional size and form. The assemble of filter elements can be done quick and uncomplicatedly. The development is on the whole economic and of reliable quality, therefore minimum measures for the maintenance are required for ensuring the purification of liquids with uniform opening sizes and hereby with uniform purification quality.

The invention will be now described more detailed through several embodiments shown by way of example, with reference to the drawing, where FIG. 1 is a perspective view of a filter element of a cylindrical filter;

Figure 1:
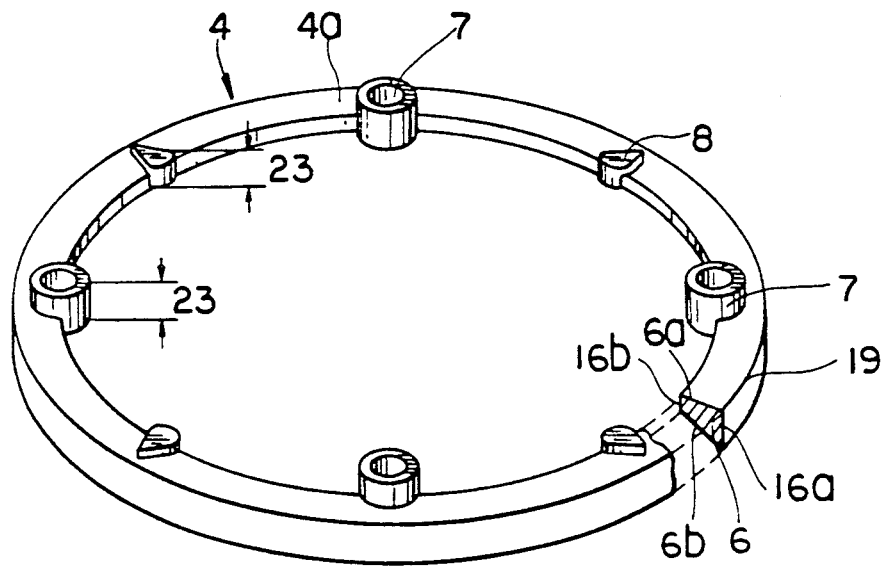

The essential constructions of a cylindrical or flat liquid filter (1, 2) by applying one-section filter elements (4, 5, 8) is shown in FIG. 1, 4b, 4a, 6a, 6b and 8, FIG. 1 illustrated perspectively a one-section filter element made of one piece of the cylindrical filter, having trapezoidal cross section with parallel base sides (16a, 16b). From one oblique side (6a), advantageously from the upper one, several sleeves like hollow cylinders (7) and drop- or wedge-shaped distance holders extend in equal distances but alternately. In the other oblique side face (6b) recesses corresponding to the sleeves (7) and distance holders (8) are made, consequently when superposing the elements, the sleeves, and distance holders, respectively, adapt themselves to these recesses. The longer parallel base side (16a) of the trapezoidal cross section (6) has, together with the inner height (22) of a filter opening (3), the same height as the sleeves, (7), and the distance holders (8), respectively.

Figure 6A:
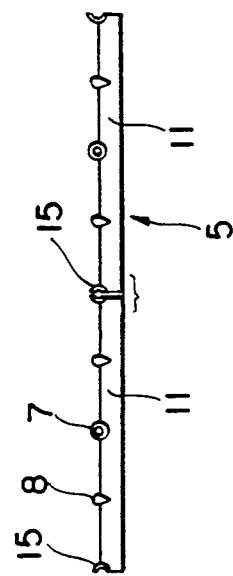
FIG. 6a, 6b show a flat filter in side elevation and in top view.
Figure 7B:
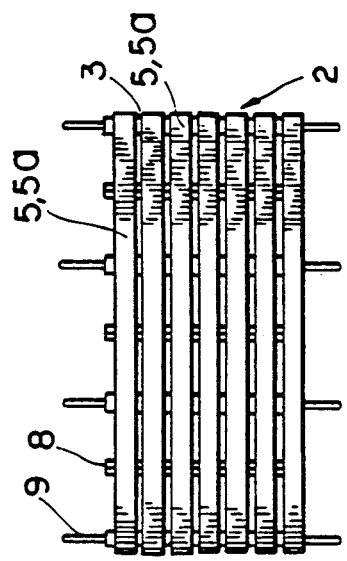
Figure 6B:
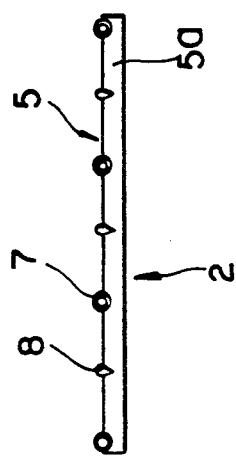

FIGS. 6a and 6b illustrate the construction of a flat filter (2) where the one-section straight filter elements (5) superposed on each other are fastened by the round coupling rods (9) leg through the sleeves (7) of the filter elements, whereas the filter openings (3) are formed by the arrangement of the distance pieces (8).

Figure 2:
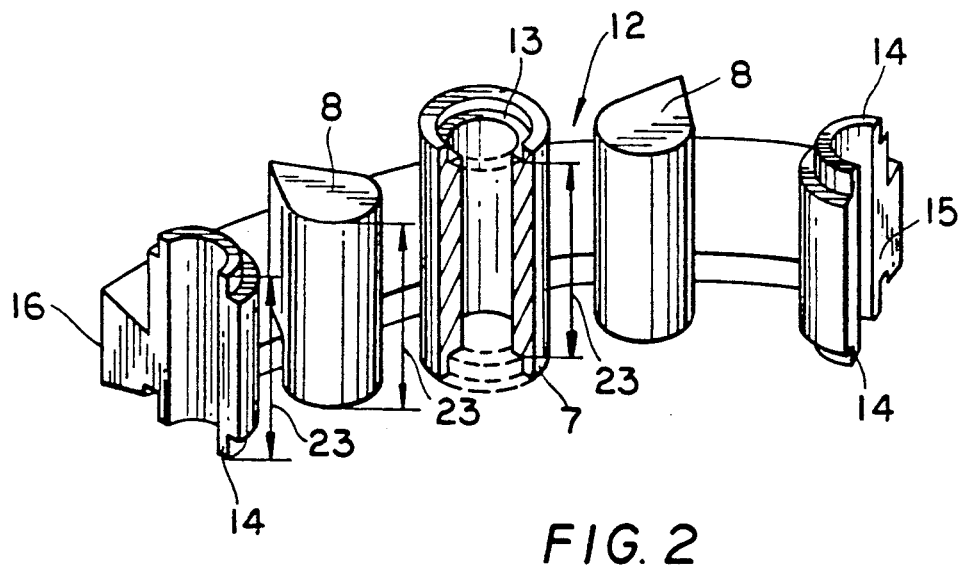
FIG. 2 is the perspective view of a segment of a ring-shaped filter element for a cylindrical filter with large diameter.

FIG. 2 shows a ring-shaped segment (12) of a filter element (4) of the cylindrical filter (1). In the middle of the round filter segment (12) the sleeve (7) is to be found together with the adjacent distance holder (8), whereas at both outer ends of the segment (12) half-sleeves (15) i.e. axially halved sleeves are placed, provided always at both ends with joining flanges (14) which adapt themselves to the corresponding joining notches (13) of the concentric sleeve of another element.

Figure 3:
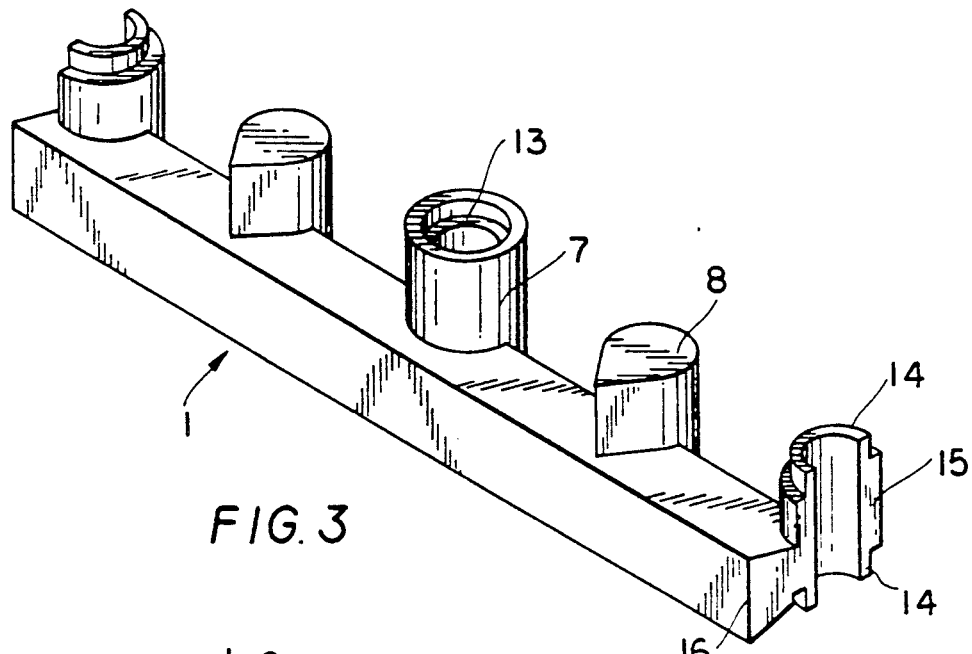
FIG. 3 is a perspective view of a straight partial unit of a filter element of a flat filter
Figure 4A:
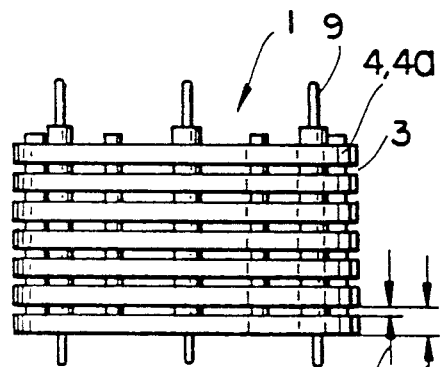
FIG. 4a, 4b show a cylindrical filter in side elevation and in top view.
Figure 5A:
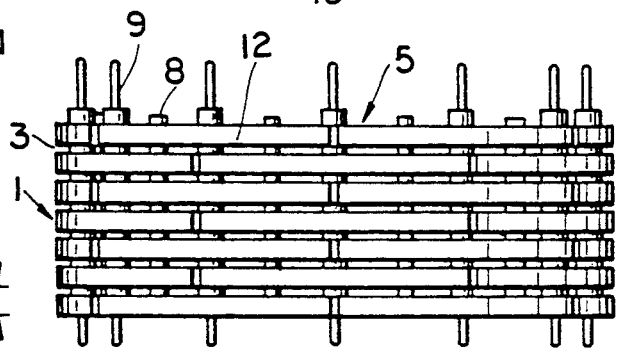
FIG. 5a, 5b show a large diameter cylindrical filter in side elevation and in top view.
Figure 4B:
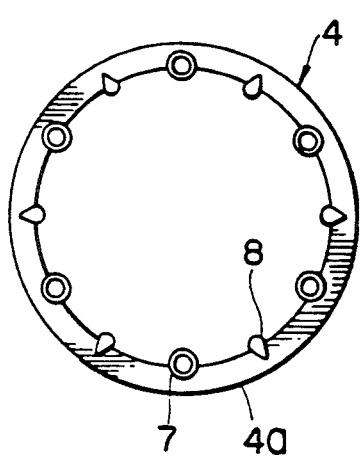
Figure 5B:
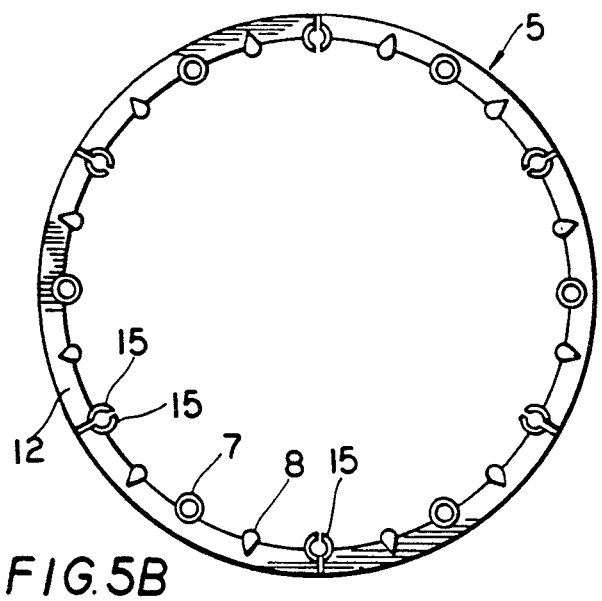

FIG. 3 illustrated the construction of a straight partial unit (11) of an assembled filter element (5) of the flat filter (2), where similarly to the embodiment according to FIG. 2, on both ends of the partial unit (11) a half-sleeve each (15) is provided with joining flanges (14). In the middle of the component (11) a sleeve (7) formed on both sides with joining notches is arranged for receiving the joining flange (14) bordered by two distance holders (8).

FIGS. 5a and 5b and 7a and 7b, respectively, show a cylindrical or flat filter construction (1, resp. 2) built up of ring-shaped (4) or straight (5) filter elements consisting of segments (12), and partial units (11), respectively.

The segment of partial units (12, 11) are joined along the half-sleeves (5) in the same plane and then, the corresponding partial units or segments (11 or 12) are combined in a form laid brick-like one above the other by the central sleeve (7) provided with notch (13). In this was, a cylindrical (1) or flat (2) filter equipment consisting of filter elements will be produced.

Figure 9:
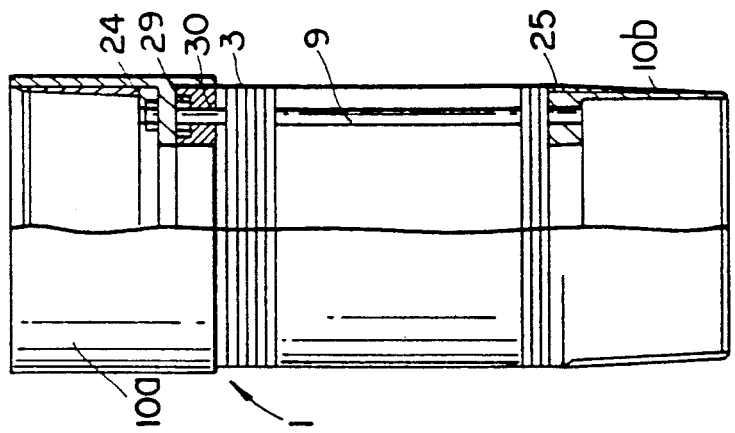
FIG. 9 is the view of a filter tube assembled of several filter elements and joining flanges, in detailed section.
Figure 7A:
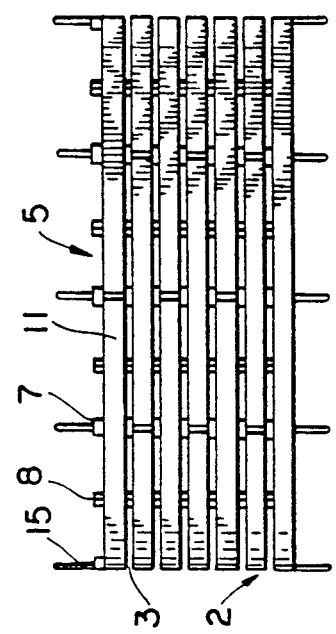
FIG. 7a, 7b show two views of a flat filter, constructed as large-surface filter.

The filter (1, 2) consists of filter elements (4, 5) having sleeves (7) and distance holders (8). Round stiffening rods (9) fastened—as shown in FIG. 9—at the locking flanges (10) by means of nuts (24) or by screwed connections (25) or welding are led through the sleeves.

Between the upper locking flange (10a) and the row of filter elements below it a pressure disc (29) is arranged, fastening the filter elements through stiffening rods (9) and nut (30), whereas the upper locking flange (10a) is thrust on to the stiffening rods (9) and fastened on the pressure disc (29) by nuts (24). The pressure disc (29) and the locking flange (10a) can form, however, one single piece.

At the same time, the locking flanges (10a, 10b) are developed so that one flange has a male thread to be screwed in the female thread of the second flange. According to the required filter length, several partial filters (1) can be axially superposed and screwed.

The locking flanges can be, however, developed as slip-on flange instead of as scew flange, where the flange part to be slipped up has an appropriate engaging embossment and the flange part to be thrust in has an engaging swell for the mutual fixing of flanges and thereby of the filter elements. The joints have to be constructed at any rate so that they could bear the dead weight of the e.g. cylindrical filter composed of several partial filters.

Figure 8:
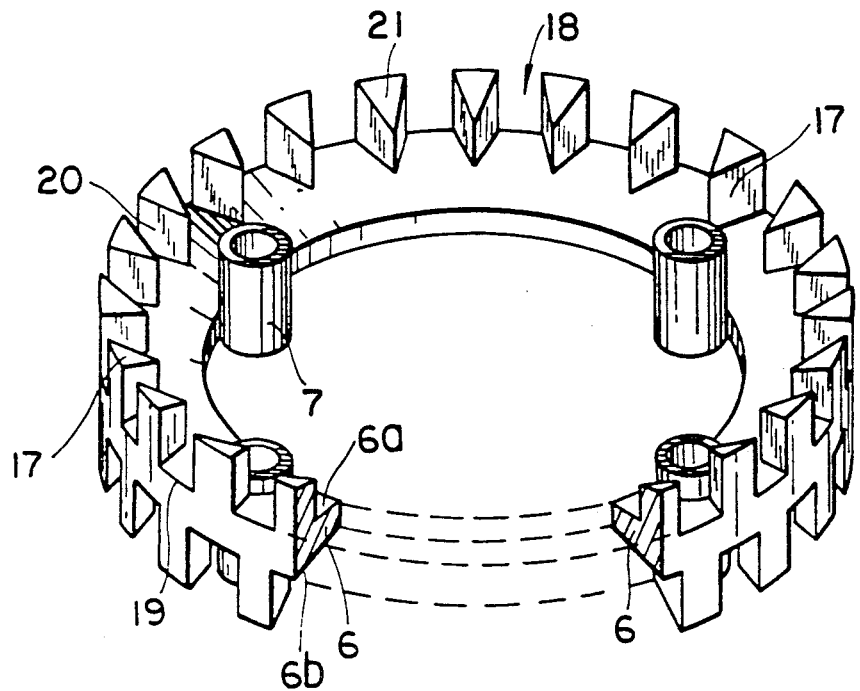
FIG. 8 is a perspective view of a filter element provided on both sides with polygonal teeth.
Figure 10:
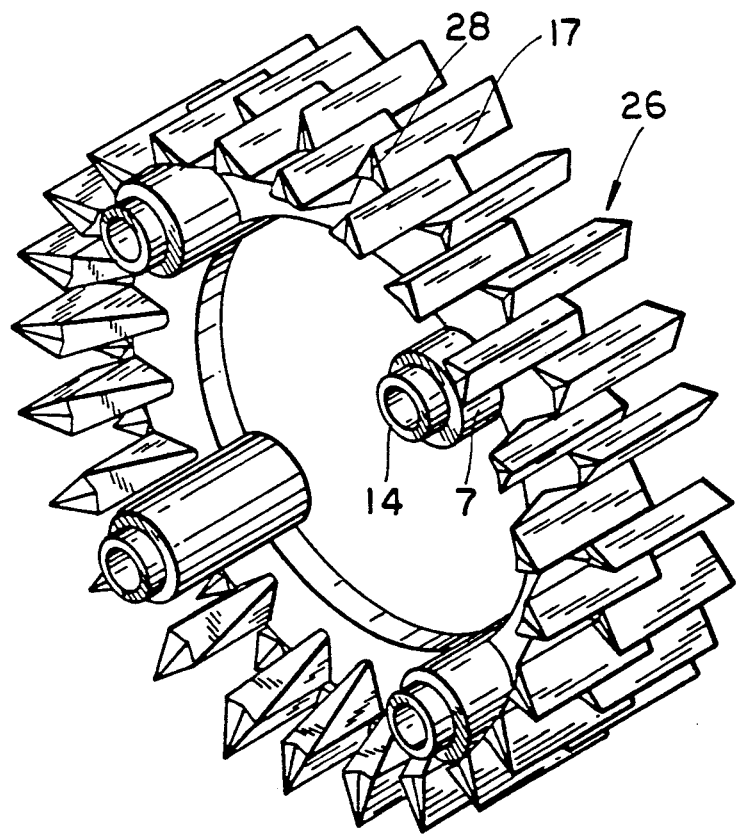
FIG. 10 is a perspective view of a further practical embodiment of a ring-shaped filter element provided on both sides with polygonal teeth, having rooflike outer tooth surface.

Finally, FIG. 10 shows another embodiment of a ring-shaped filter element (26) where—similarly to the embodiment according to FIG. 8—both oblique side faces (6a, 6b) of the ring elements have teeth (7) arranged protruding from these surfaces in the same vertical direction as the large base side. Here, the teeth show always a prism-shaped or rooflike triangular surface (21) projecting from the mantle surface formed by the large base side of the trapezoidal cross section (6). Moreover the teeth are shifted intermittently in vertical, respectively, axial direction so that every second tooth extends above the upper edge (19) of the trapezoidal cross section, whereas the tooth lying between them ends practically with this edge. Consequently the tooth base of each second tooth ends practically in height of the edge (19), whereas the prevailing tooth tips have at the same time an inside inclination (28) tilting inwards towards the centre of the ring in the same tilting direction as the corresponding side face of the trapezoidal cross section. Finally, the single teeth (17) stand additionally wedge-shaped on the oblique side of the trapezoidal cross section (6), and at the same time they plunge into the inside of the ring, whereby similarly the flow rate of the liquid to be filtered is influenced. The sleeves (7) are provided in the same way as with the examples according to FIGS. 2, 3 and 8 with centering or joining flange (14) and joining notch (13) which define the height (3) of the filter openings.

We claim:

1. A filter for cylindrical or flat filter equipment for the mechanical purification of liquids contaminated with micro- or macro-particles including:
    filter elements having a trapezoidal cross section with parallel inner and outer base sides and upper and lower oblique sides that taper inwardly, said filter elements arranged to be stacked on top of one another so that said upper and lower oblique sides of adjacent filter elements define inwardly widening filter openings;
    sleeve members and distance holder members uniformly distributed about each filter element and connected to said filter elements to space apart adjacent filter elements, each said sleeve member having a bore defined therein; and
    locking means engageable with said filter elements, through the bores in the sleeve members, to retain stacked filter elements in a locked position.

2. The filter according to claim 1, wherein said locking means includes stiffening rods that pass through the bores and locking flanges that engage ends of said stiffening rods to secure stacked filter elements in a locked position.

3. The filter according to claim 2, wherein said distance holder members and said sleeve members are positioned so that one distance holder member is positioned between two sleeve members, and wherein said distance holder members have an outwardly tapering teardrop-like shape.

4. The filter according to claim 1, wherein said distance holder members are polygonal teeth alternately extending from the outer base side, the upper oblique side and the lower oblique side, said teeth having a wedge-like shape and distal surfaces that are inclined parallel to adjacent upper and lower oblique surfaces.

5. The filter according to claim 1, wherein each said filter element is formed by interconnecting filter element segments, and wherein each said filter element segment including a single sleeve member positioned at a middle portion of said segment, said sleeve member having a joining notch at both of its ends; two distance holder members symmetrically positioned about the sleeve member; and half-sleeve members positioned at ends of the segment, said half-sleeve member having joining flanges at both ends of each half-sleeve members, said flanges being engageable with said notches of an overlying and underlying filter element segment so that the connection of said notches and joining members permits filter elements to be formed.

* * * * *